(12) United States Patent
Ohlman et al.

(10) Patent No.: US 8,074,603 B2
(45) Date of Patent: Dec. 13, 2011

(54) ANIMAL WASTE DISPOSAL SYSTEM

(75) Inventors: Vernon C. Ohlman, Ada, MI (US); Barry Lilly, Grand Rapids, MI (US)

(73) Assignee: Millenium Research Group, Ltd., Grand Rapids, MI (US)

( * ) Notice: Subject to any disclaimer, the term of this patent is extended or adjusted under 35 U.S.C. 154(b) by 176 days.

(21) Appl. No.: 12/503,453

(22) Filed: Jul. 15, 2009

(65) Prior Publication Data

US 2011/0011347 A1    Jan. 20, 2011

(51) Int. Cl.
*A01K 1/035* (2006.01)
(52) U.S. Cl. ........................................................ 119/167
(58) Field of Classification Search ................... 119/161, 119/165–167
See application file for complete search history.

(56) References Cited

U.S. PATENT DOCUMENTS

| | | | |
|---|---|---|---|
| 3,684,155 A | 8/1972 | Smith | |
| 3,771,493 A * | 11/1973 | Chandor | 119/170 |
| 3,809,013 A | 5/1974 | Rigney et al. | |
| 4,217,857 A | 8/1980 | Geddie | |
| 4,305,544 A | 12/1981 | Noonan | |
| 4,308,825 A * | 1/1982 | Stepanian | 119/167 |
| 4,312,295 A | 1/1982 | Harrington | |
| 4,548,160 A | 10/1985 | Feitelson | |
| 4,615,300 A | 10/1986 | McDonough | |
| 4,723,510 A | 2/1988 | Skillestad | |
| 4,739,725 A | 4/1988 | Fennelly | |
| 4,784,082 A | 11/1988 | Wolfe | |
| 4,813,374 A * | 3/1989 | Sides | 119/170 |
| 4,846,105 A | 7/1989 | Caldwell | |
| 4,869,204 A * | 9/1989 | Yananton | 119/169 |
| 4,870,924 A * | 10/1989 | Wolfe | 119/167 |
| 4,967,692 A | 11/1990 | Mills | |
| 5,038,721 A * | 8/1991 | Ouellette et al. | 119/167 |
| 5,062,392 A | 11/1991 | Lavash | |
| 5,078,099 A | 1/1992 | Balson | |
| 5,115,766 A | 5/1992 | Williams | |
| 5,121,712 A | 6/1992 | Schulein, Jr. et al. | |
| 5,158,042 A | 10/1992 | Hammerslag et al. | |
| 5,207,772 A | 5/1993 | Lauretta et al. | |
| 5,325,815 A | 7/1994 | Gumpesberger | |
| 5,488,929 A | 2/1996 | Pierson et al. | |
| 5,499,610 A | 3/1996 | Bruner et al. | |
| 5,551,376 A | 9/1996 | Lundeen et al. | |
| D378,451 S | 3/1997 | Schmidt | |
| 5,752,466 A | 5/1998 | Lundeen et al. | |
| 5,832,869 A | 11/1998 | Franczak et al. | |
| 5,890,452 A | 4/1999 | Lundeen et al. | |
| 5,983,832 A | 11/1999 | Seo | |
| 6,595,159 B1 | 7/2003 | Montalbano | |
| 6,668,755 B1 | 12/2003 | Koster | |
| D488,890 S | 4/2004 | Radde | |
| 7,255,261 B2 | 8/2007 | Mesly | |
| 2007/0215058 A1 | 9/2007 | Spreitzer | |
| 2007/0215059 A1 | 9/2007 | Sefranek | |
| 2008/0041316 A1 | 2/2008 | Hartzell | |
| 2009/0194033 A1 * | 8/2009 | Modlin | 119/167 |

* cited by examiner

*Primary Examiner* — Rob Swiatek
*Assistant Examiner* — Kathleen Iwasaki
(74) *Attorney, Agent, or Firm* — Price Heneveld LLP

(57) ABSTRACT

A waste disposal system includes a basin having a bottom and at least one side. A retainer is disposed in the basin. A plurality of flexible nets are disposed in the basin. A securing rim is in abutting contact over the at least one side edge of the basin. The plurality of nets have at least one edge disposed between the securing rim and the basin.

8 Claims, 8 Drawing Sheets

ANIMAL WASTE DISPOSAL SYSTEM

BACKGROUND OF THE INVENTION

The present invention generally relates to an animal waste disposal system, and more specifically, to an animal waste disposal system that is easy to clean and dispose of.

SUMMARY OF THE INVENTION

In one aspect of the present invention, a waste disposal system includes a basin having a bottom and at least one side. A retainer is disposed in the basin. A plurality of flexible nets are disposed in the basin. A securing rim is in abutting contact over the at least one side edge of the basin. The plurality of nets have at least one edge disposed between the securing rim and the basin.

In another aspect of the present invention, a waste disposal system includes a basin having a plurality of sides. A plurality of flexible nets are disposed in the basin. A removable rim has a plurality of downwardly extending walls adjacent to the sides of the basin. At least one edge of the plurality of nets is disposed between at least one downwardly extending wall of the removable rim and at least one side of the basin.

In another aspect of the present invention, a method of making a waste disposal system includes forming a basin having a plurality of sides. A plurality of flexible nets are inserted into the basin. A portion of the basin is covered with a removable rim that has a plurality of downwardly extending walls. Side edges of the flexible nets are positioned between the sides of the basin and the downwardly extending walls of the removable rim.

In yet another aspect of the present invention, a method of disposing of animal waste includes providing a basin. A plurality of flexible nets are inserted in the basin. At least a portion of the plurality of nets is covered with a removable rim. An absorbable litter material is placed in the basin over the plurality of nets. The removable rim is withdrawn from the basin, retracting the topmost of the plurality of nets from the basin, allowing the absorbable litter material to filter through the net. The net and any waste are then disposed.

These and other features, advantages and objects of the present invention will be further understood and appreciated by those skilled in the art upon studying the following specification, claims, and appended drawings.

DETAILED DESCRIPTION OF PREFERRED EMBODIMENT

Figure 1:
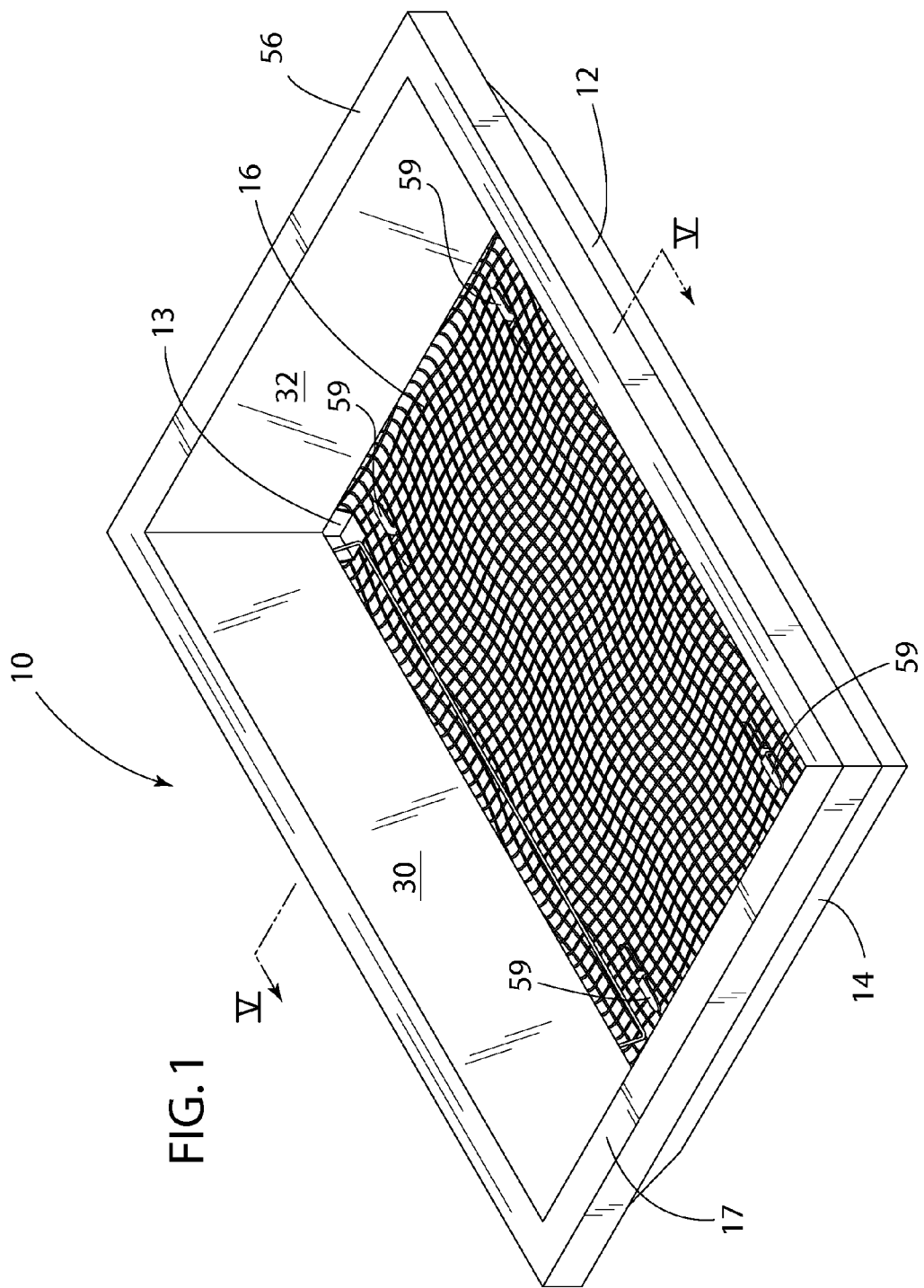
FIG. 1 is a top perspective view of one embodiment of a waste disposal system of the present invention.

For purposes of description herein the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
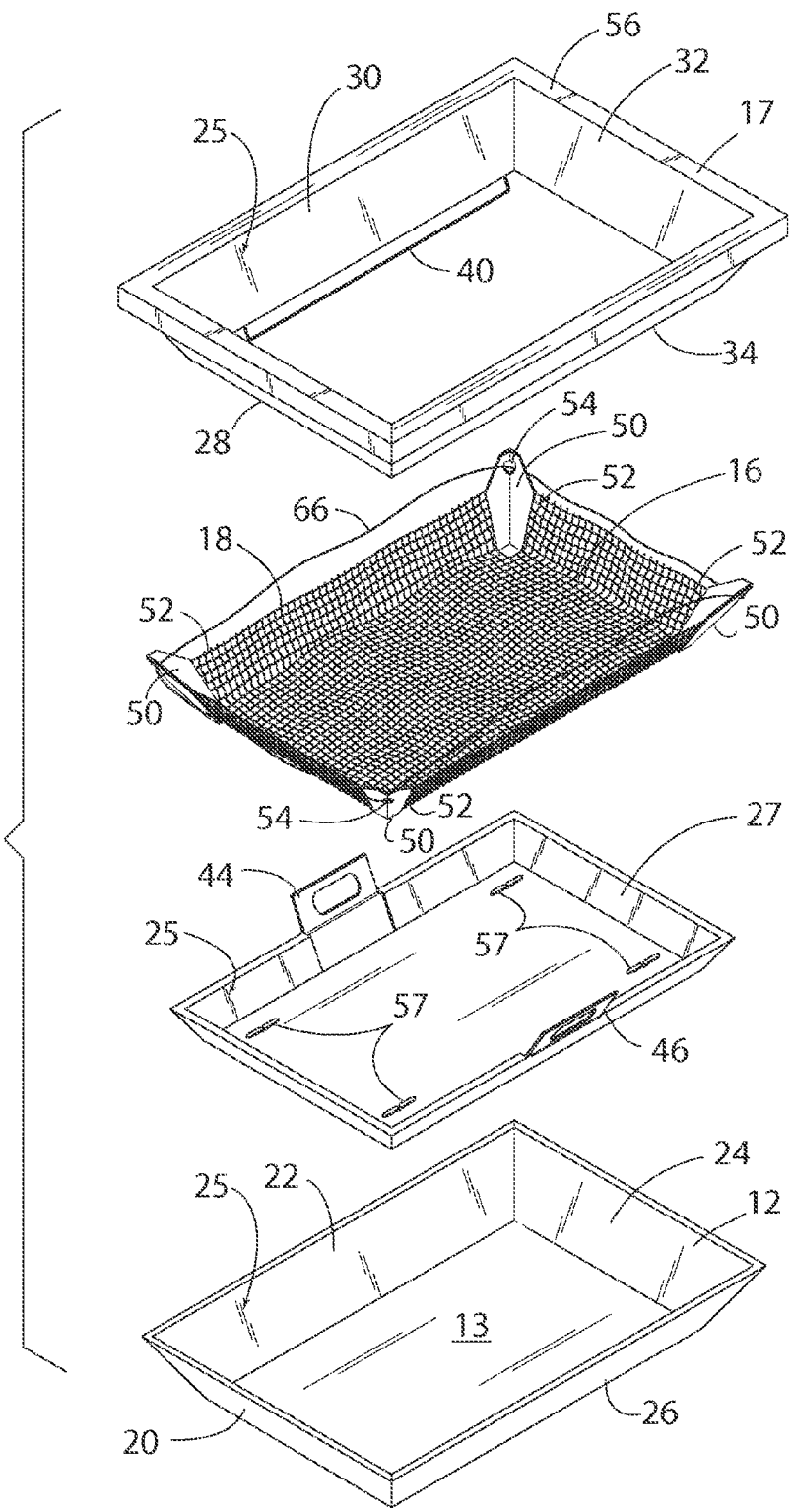
FIG. 2 is a top perspective exploded view of the waste disposal system of FIG. 1.

The reference numeral 10 shown in FIGS. 1 and 2 generally designates a waste disposal system embodying the present invention. The waste disposal system 10 includes a basin 12 having a bottom 13 and at least one side 14. A plurality of flexible nets 16 are disposed in the basin 12. A securing rim 17 is disposed over the at least one side edge 14 of the basin 12. The plurality of nets 16 have at least one edge 18 disposed between the securing rim 17 and the basin 12.

Referring again to FIGS. 1 and 2, the basin 12 of the illustrated embodiment includes a first side 20, a second side 22, a third side 24, and a fourth side 26, each of which is slanted outward from the basin 12. A retainer 27 is disposed in the basin 12 and has a shape complementary to the basin 12. In the illustrated embodiment of FIG. 2, the nets 16 rest inside the retainer 27. However, it is contemplated that the nets 16 could rest directly in the basin 12. The securing rim 17 includes a first wall 28, a second wall 30, a third wall 32, and a fourth wall 34 that extend downward at approximately the same angle as the sides 20, 22, 24, 26 of the basin 12. A support bar 40 extends from the second and fourth downwardly extending walls 30, 34 of the securing rim 17 and supports the securing rim 17 in a predetermined position above the flexible nets 16. The flexible nets 16 and securing rim 17 may be secured directly into the basin 12 or may rest in the retainer 27 disposed in the basin 12. The retainer 27 includes first and second handles 44, 46 that allow a user to remove the retainer 27 and the nets 16, as well as any litter material 48 (FIG. 5) and animal waste 49 (FIG. 8) from the basin 12. The securing rim 17, retainer 27, and basin 12 are all constructed from a cardboard material that has a coating 25 or that is infused with a polymer, wax, or like material.

Figure 3:
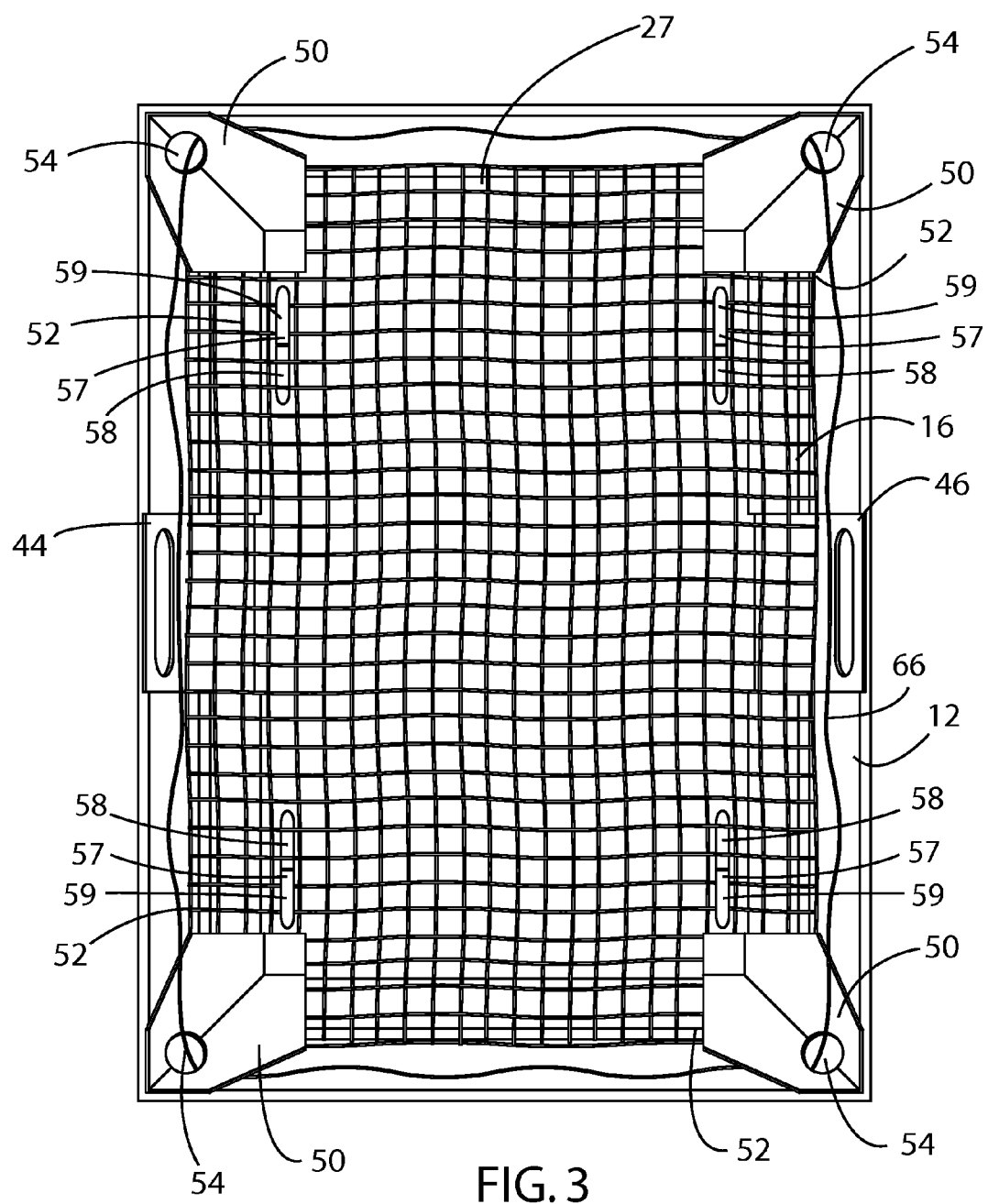
FIG. 3 is a top plan view of the waste disposal system of FIG. 1 with the securing rim removed.
Figure 4:
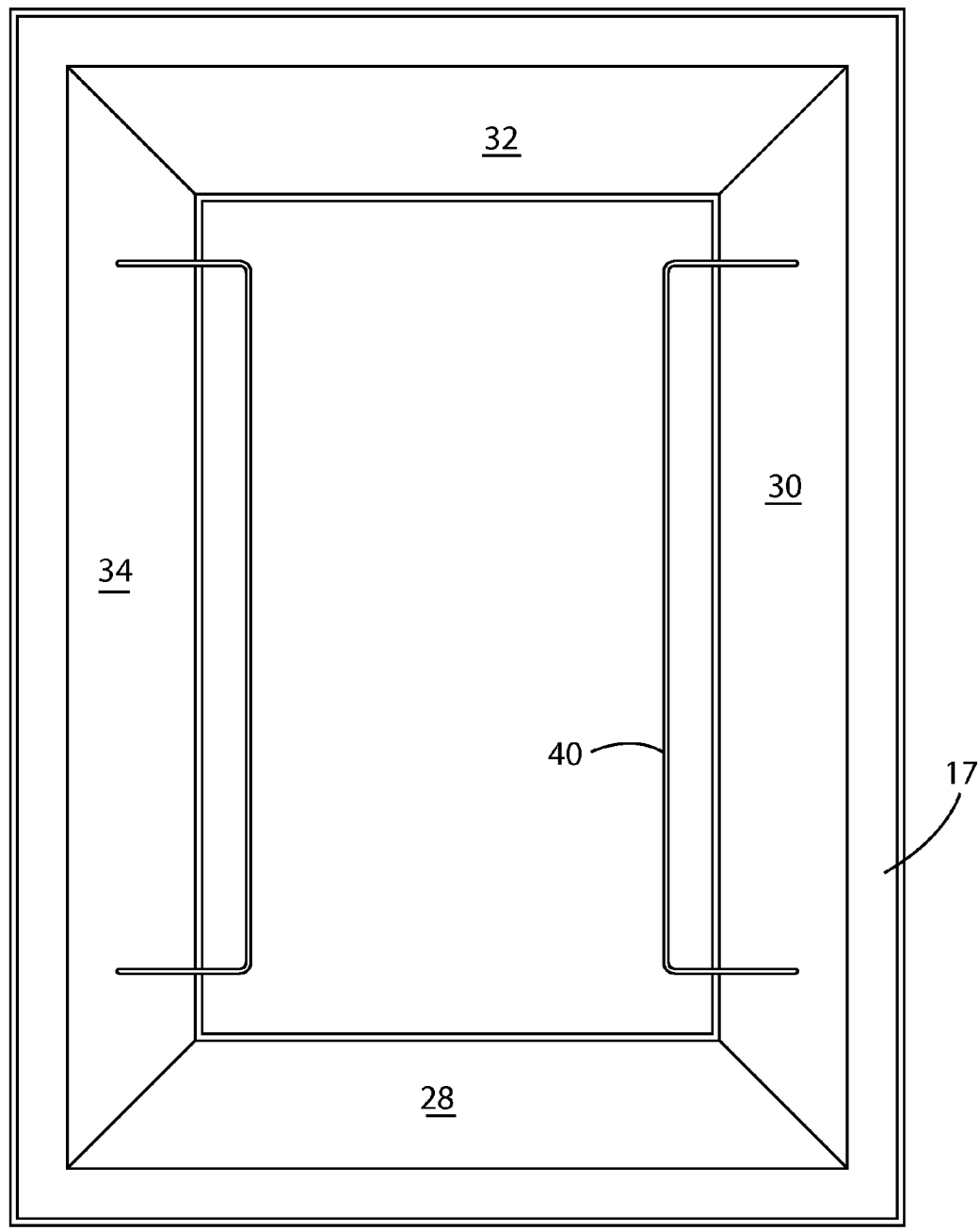
FIG. 4 is a bottom plan view of the securing rim.

Referring to FIG. 3, each net 16 includes a finger grip 50 disposed at each corner 52 of the net 16. The finger grips 50 assist a user in removing one net 16 at a time from the basin 12. Each finger grip 50 includes an aperture 54 to assist the user in holding the finger grip 50. To remove animal waste 49 and litter material 48 from the retainer 27 or basin 12, each of the four corners 52, by way of the finger grip 50, are drawn to the center of the retainer 27 or basin 12 and the flexible net 16 is lifted upward, as discussed in further detail below. The securing rim 17 has a top edge 56 (FIG. 2) that extends around the perimeter of the securing rim 17. Each of the first, second, third, and fourth walls 28, 30, 32, 34 connect with the top edge 56. The support bars 40 are connected to the securing rim 17 to support the securing rim 17 above the retainer 27 or basin 12. Although the illustration of FIG. 4 shows the support bars 40 extending from the second and fourth walls 30, 34 of the securing rim 17, it is contemplated that the support bars 40 could be disposed on the first and third walls 28, 32 of the securing rim 17, or on each of the downwardly extending walls 28, 30, 32, 34 of the securing rim 17.

Referring again to FIG. 3, tabs 57 may be disposed in the retainer 27 to secure the nets 16 inside the retainer 27. The tabs 57 include first and second legs 58, 59 that extend upwardly from the retainer 27. The first leg 58 holds the tab 57 in place and is disposed below the nets 16. The second leg 59 extends over the nets 16 and assists in holding the nets 16 against the retainer 27. It is also contemplated that both legs 58, 59 could be positioned over the nets 16 or that only one leg 59 be attached to the tab 57 and extend over the nets 16. It will be understood by a person having ordinary skill in the art that any number of tabs 57 may be present.

Figure 5:
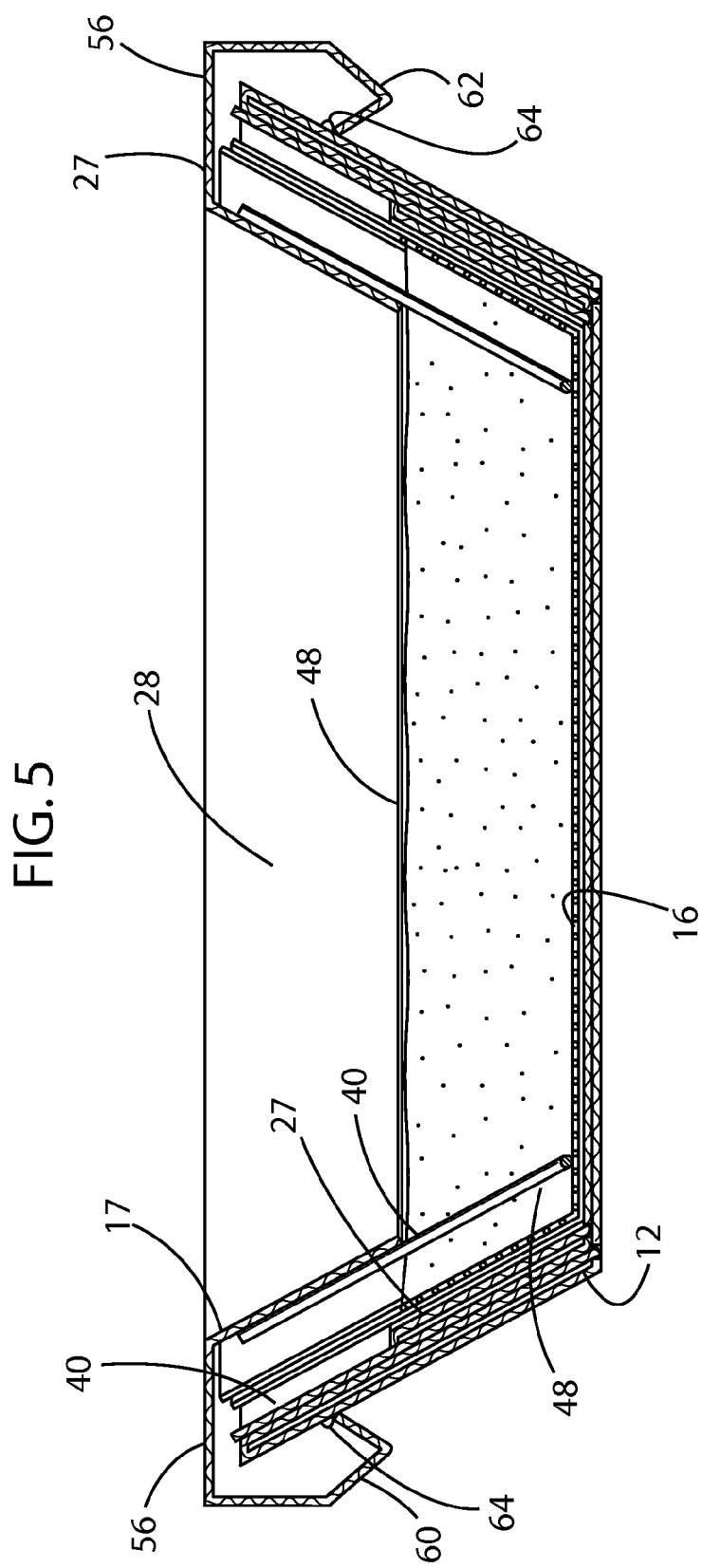
FIG. 5 is a side cross-sectional elevational view taken at line V-V of FIG. 1.

Referring to FIG. 5, the securing rim 17 includes first and second latches 60, 62 that engage a knob 64 that extends outwardly from the first and third sides 20, 24 of the basin 12. The support bars 40 may either rest directly on the nets 16 or extend partially into the litter material 48 above the nets 16 in the retainer 27. The nets 16 are disposed below the litter material 48, and are drawn up through the litter material 48 when each of the four corners 52 of the topmost net 16 are drawn upward by the finger grips 50. The support bars 40 assist in keeping the finger grips 50 secured between the rim 17 and the retainer 27, and prevent animals using the waste disposal system 10 from exposing a corner of the nets 16.

Figure 6:
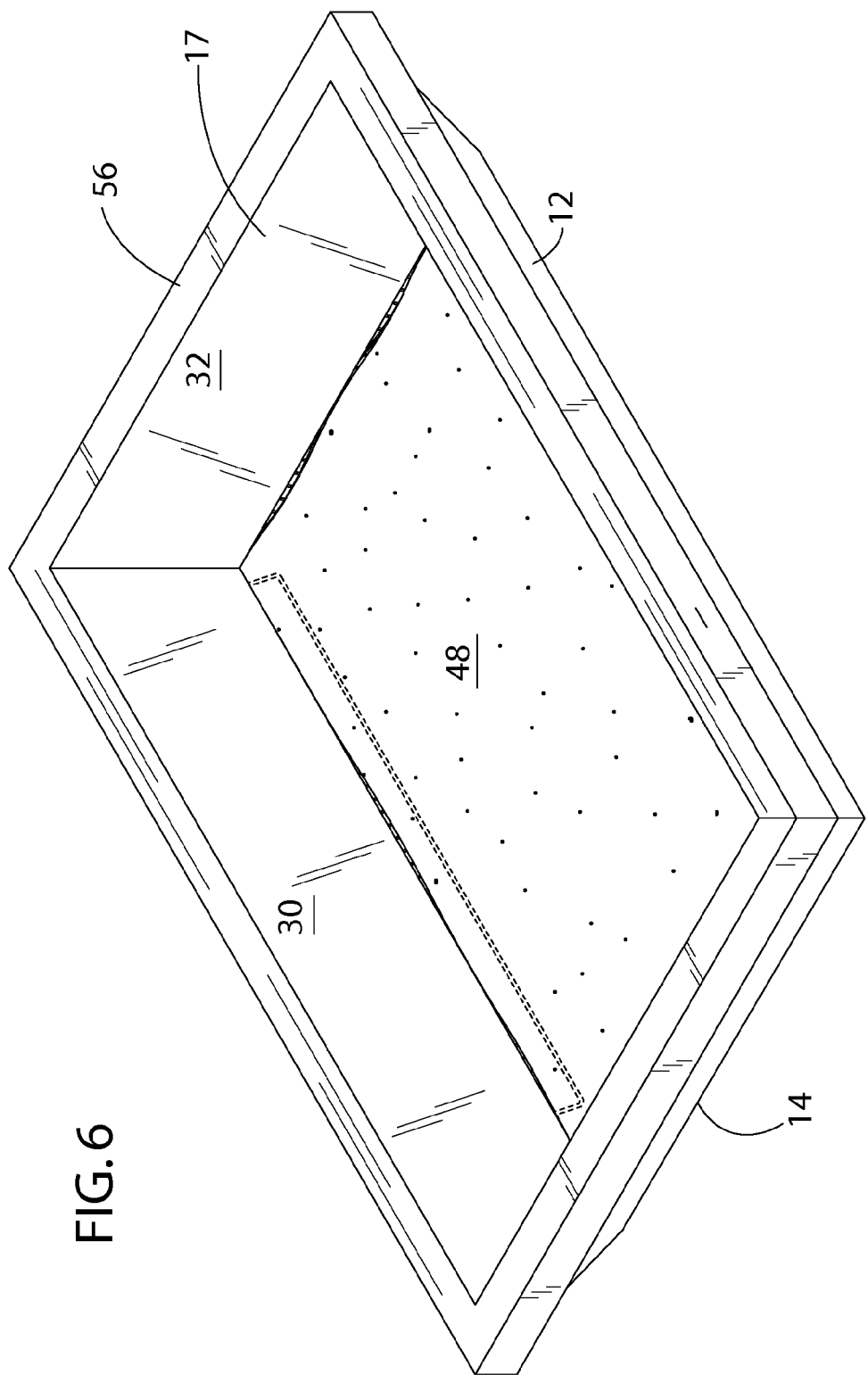
FIG. 6 is the waste disposal system of FIG. 1 with litter material disposed in the waste disposal system.
Figure 7:
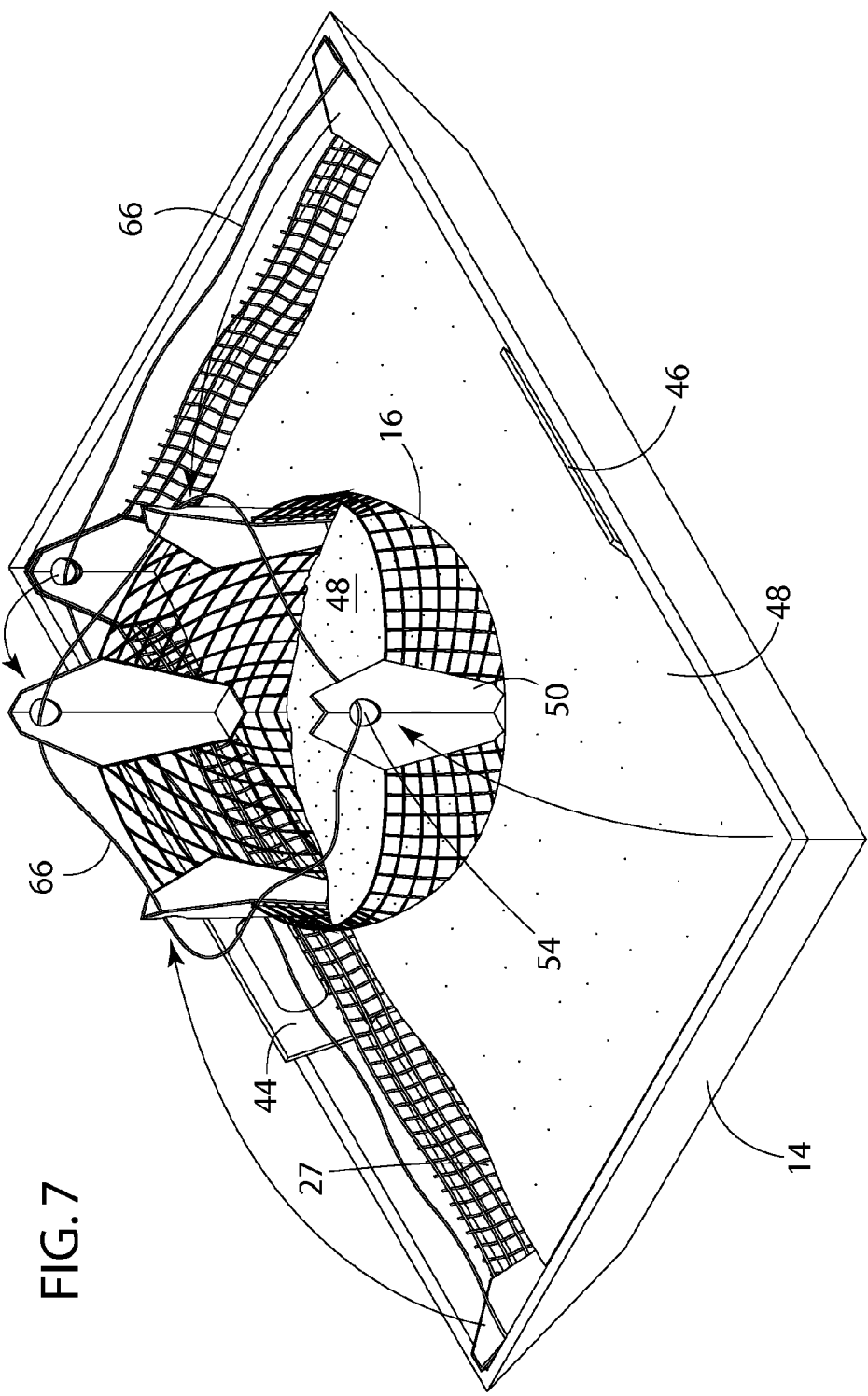
FIG. 7 is a top perspective view of one embodiment of the waste disposal system with one flexible net being withdrawn from the waste disposal system.
Figure 8:
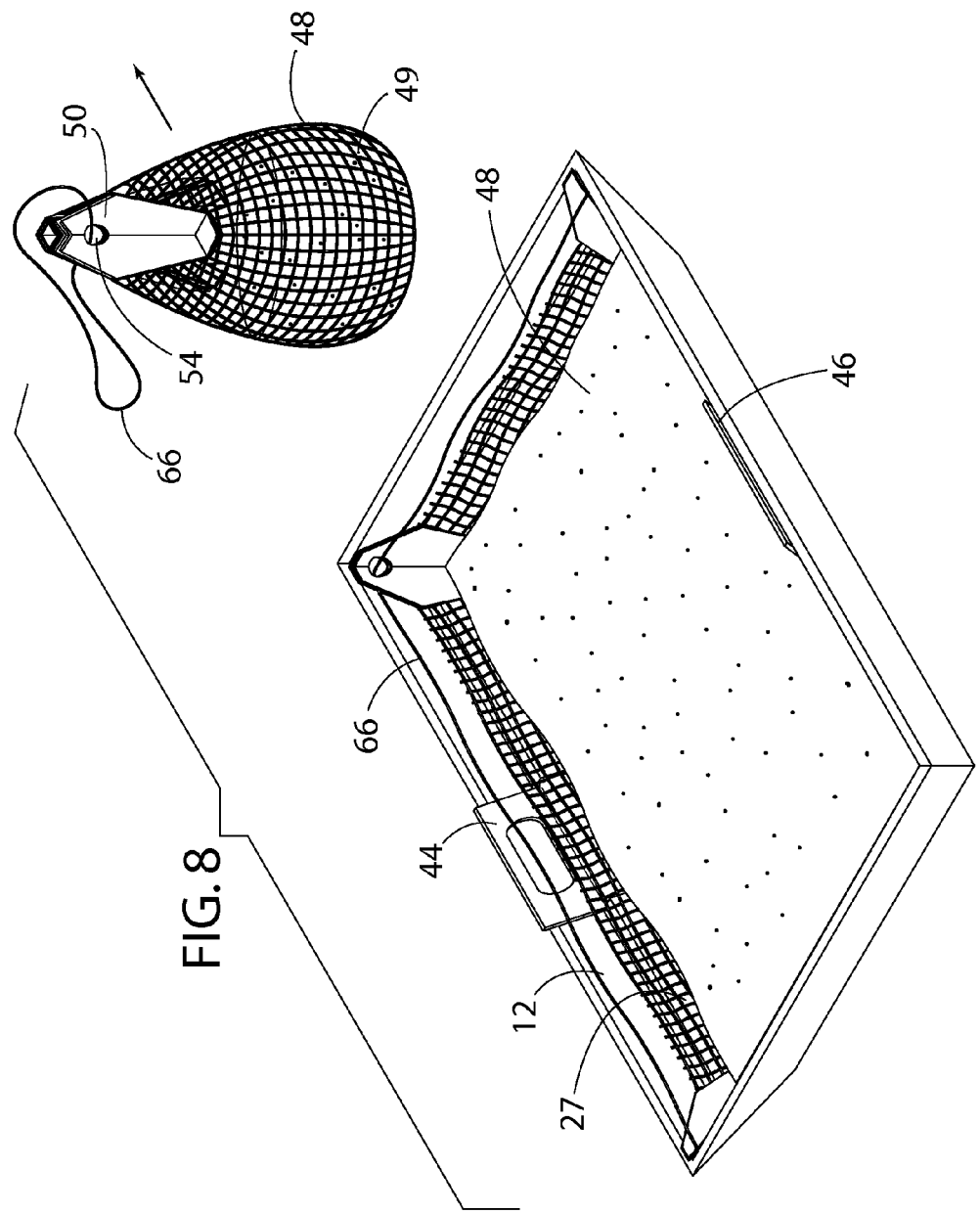
FIG. 8 is a top perspective view of the waste disposed in the flexible net and removed from the waste disposal system.

Referring now to FIGS. 6-8, clean litter material 48 is poured into the basin 12 up to the bottom of each of the downwardly extending walls 28, 30, 32, 34 of the securing rim 17. When the litter material 48 and animal waste 49 need to be removed from the waste disposal system 10, the securing rim 17 is removed and the finger grips 50 of the topmost flexible net 16 are pulled upward. Any excess litter material 48 spills through the net 16 into the retainer 27 or basin 12. Meanwhile, the animal waste 49 and net 16 may be disposed of as garbage. Alternatively, the net 16 may be constructed of biodegradable material and flushed down a toilet. The retainer 27 and basin 12 are then available and ready for continued use with the remaining nets 16 still disposed below the litter material 48 that remains in the basin 12, as shown in FIG. 8. After the animal waste 49 and litter material 48 have been removed, the securing rim 17 is installed back on the basin 12. As shown in the embodiment illustrated in FIG. 7, the nets 16 may include a drawstring 66 that extends through the apertures 54 of each finger grip 50. It is also contemplated that the drawstring 66 could extend through the holes of the nets 16 or through sleeves attached to the nets 16.

One embodiment of making the waste disposal system 10 includes forming the basin 12 with sides 20, 22, 24, 26. The plurality of flexible nets 16 are inserted into the basin 12. A portion of the basin 12 is covered with the removable rim 17. Side edges of the flexible nets 16 are positioned between the sides 20, 22, 24, 26 of the basin 12 and the downwardly extending walls 28, 30, 32, 34 of the removable rim 17.

One embodiment of a method of disposing of animal waste 49 includes providing the basin 12. The plurality of flexible nets 16 are inserted in the basin 12. At least a portion of the plurality of nets 16 is covered with the removable rim 17. Absorbable litter material 48 is placed in the basin 12 over the plurality of nets 16. The removable rim 17 is withdrawn from the basin 12, and the topmost of the plurality of nets 16 is retracted from the basin 12, allowing the absorbable litter material 48 to filter through the net 16. The net 16 and any animal waste 49 are then disposed.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A waste disposal system comprising:
   a basin having a bottom and a plurality of sides;
   a retainer disposed in the basin, wherein the retainer is constructed from a semi-rigid material, and wherein the retainer includes a pair of handles disposed on opposing sides of the retainer;
   a plurality of flexible nets disposed in the retainer, wherein each of the plurality of nets include at least one finger grip disposed on at least one corner, the at least one finger grip adapted to assist a user in removing one of the plurality of nets;
   at least one securing to disposed in the retainer at base portion of the retainer and adapted to removably secure at least one of the plurality of flexible nets to the retainer;
   a securing rim in abutting contact over the at least one side edge of the basin, the plurality of nets having at least one edge disposed between the securing rim and the basin; and
   a pair of support bars disposed on opposing bottom edges of the securing rim and extending substantially the entire length of the opposing bottom edges, wherein the securing rim is spaced above the nets by the support bars.

2. The waste disposal system of claim 1, further comprising:
   a latch mechanism adapted to secure the securing rim on the basin.

3. The waste disposal system of claim 1, wherein the at least one finger grip is disposed between the retainer and the securing rim.

4. The waste disposal system of claim 1, further comprising:
   a coating that covers an interior portion of the basin.

5. The waste disposal system of claim 1, wherein the basin and rim are constructed of a wax saturated cardboard.

6. A method of making a waste disposal system, the method comprising:
   forming a basin having a plurality of sides;
   inserting a retainer into the basin, wherein the retainer is constructed from a semi-rigid material having a plurality of handles;
   inserting a plurality of flexible nets into the retainer;
   covering a portion of the basin with a removable rim having a plurality of downwardly extending walls;
   extending a support bar from at least one of the plurality of downwardly extending walls, wherein the securing rim is spaced above the nets by the support bar; and
   positioning side edges of the flexible nets between the sides of the basin and the downwardly extending walls of the removable rim.

7. The method of claim 6, further comprising:
   connecting a finger grip on at least one of the plurality of flexible nets.

8. The method of claim 6, further comprising:
   a latch mechanism that removably connects the removable rim with the basin.

* * * * *

UNITED STATES PATENT AND TRADEMARK OFFICE
CERTIFICATE OF CORRECTION

| | | |
|---|---|---|
| PATENT NO. | : 8,074,603 B2 | Page 1 of 1 |
| APPLICATION NO. | : 12/503453 | |
| DATED | : December 13, 2011 | |
| INVENTOR(S) | : Vernon C. Ohlman and Barry Lilly | |

It is certified that error appears in the above-identified patent and that said Letters Patent is hereby corrected as shown below:

Face of patent, item (73) Assignee

"Millenium" should be "Millennium"

Signed and Sealed this
Third Day of April, 2012

David J. Kappos
*Director of the United States Patent and Trademark Office*